(12) United States Patent
Kang (10) Patent No.: US 8,842,982 B2
(45) Date of Patent: Sep. 23, 2014

(54) COMMUNICATIONS NETWORK (75) Inventor: Justin Kang, Ipswich (GB)

(73) Assignee: British Telecommunications Public Limited Company, London (GB)

(*) Notice: Subject to any disclaimer, the term of this patent is extended or adjusted under 35 U.S.C. 154(b) by 0 days.

(21) Appl. No.: 13/876,753

(22) PCT Filed: Sep. 20, 2011

(86) PCT No.: PCT/GB2011/001370
§ 371 (c)(1),
(2), (4) Date: Jun. 12, 2013

(87) PCT Pub. No.: WO2012/042191
PCT Pub. Date: Apr. 5, 2012

(65) Prior Publication Data
US 2013/0259467 A1 Oct. 3, 2013

(30) Foreign Application Priority Data
Sep. 28, 2010 (EP) .................................. 10251663

(51) Int. Cl.
G03F 1/00 (2012.01)
G02F 2/00 (2006.01)
H01S 3/00 (2006.01)
H04B 10/00 (2013.01)
H04J 14/00 (2006.01)
H04B 10/038 (2013.01)
H04L 12/703 (2013.01)
H04L 12/707 (2013.01)
H04Q 11/00 (2006.01)

(52) U.S. Cl.
CPC .............. *H04B 10/038* (2013.01); *H04L 45/28* (2013.01); *H04L 45/22* (2013.01); *H04Q 11/0071* (2013.01); *H04Q 11/0067* (2013.01); *H04Q 2011/0081* (2013.01)
USPC .......... 398/2; 398/1; 398/5; 398/153; 398/168

(58) Field of Classification Search
None
See application file for complete search history.

(56) References Cited

U.S. PATENT DOCUMENTS

| 7,072,861 | B1 * | 7/2006 | Yamanaka et al. ............... 705/17 |
| 2002/0109876 | A1 * | 8/2002 | Eijk et al. ....................... 359/110 |
| 2009/0087179 | A1 * | 4/2009 | Underwood et al. ........... 398/25 |

FOREIGN PATENT DOCUMENTS

EP 1176765 1/2002

OTHER PUBLICATIONS

Hunter et al., "Routing and Past Protection in Networks of Long-Reach PONs", BT Technology Journal, vol. 24. No. 2, Apr. 2006, 7 pages.
Kang et al, "Restoration of Ethernet Services Over a Dual-Homed GPON System-Operator Requirements and Practical Demonstration", 2008 © 3 pages.
Payne et al., "The Future of Fibre Access Systems?". BT Technology Journal, vol. 20, No. 4, Oct. 2002, pp. 104-114.
Application No. PCT/GB2011/001370, International Search Report and Written Opinion of the International Searching Authority, mailed Oct. 28, 2011. 10 pages.

* cited by examiner

Primary Examiner — Darren E Wolf
(74) Attorney, Agent, or Firm — Patterson Thuente Pedersen, P.A.

(57) ABSTRACT

A passive optical network is provided which uses existing GPON OAM functionality and standard routing protocol messages to solve the downstream routing problem between an access service provider and one or more other communication provider networks.

10 Claims, 5 Drawing Sheets

COMMUNICATIONS NETWORK

RELATED APPLICATIONS

The present application is a National Phase entry of PCT Application No. PCT/GB2011/001370, filed Sep. 20, 2011, which claims priority from EP Application No. 10251663.0 filed Sep. 28, 2010, both of which are hereby incorporated by reference herein in their entireties.

TECHNICAL FIELD

The present invention relates to optical communications networks, and in particular to resilient optical communications networks.

BACKGROUND

Broadband services are commonly supplied over legacy telephony networks using digital subscriber line (DSL) technology. One of the limitations of DSL is that the maximum data rate is not that high (for example, the maximum bit-rate is around 20 Mb s$^{-1}$) and that the available bit rate decreases as the distance between the customer and the telephone exchange increases. It is believed that future broadband services are increasingly likely to be offered over optical fibre infrastructure using passive optical network (PON) architectures (D. B. Payne and R. P. Davey, "*The future of fibre access systems*", BTTJ, Vol. 20-4, pp 104-114, (2002)). There are a number of large scale PON deployments currently underway around the world using either IEEE EPON technology or FSAN/ITU BPON and GPON. There is an emerging trend from network operators to consolidate network nodes and to reduce the amount of real estate used, leading to reductions in operational costs. A consequence of centralizing network equipment into a smaller number of network nodes is that the network is more vulnerable to large scale outages in the event that a catastrophic fault (for example fire, earthquake, etc.) renders a node out of service.

Figure 1:
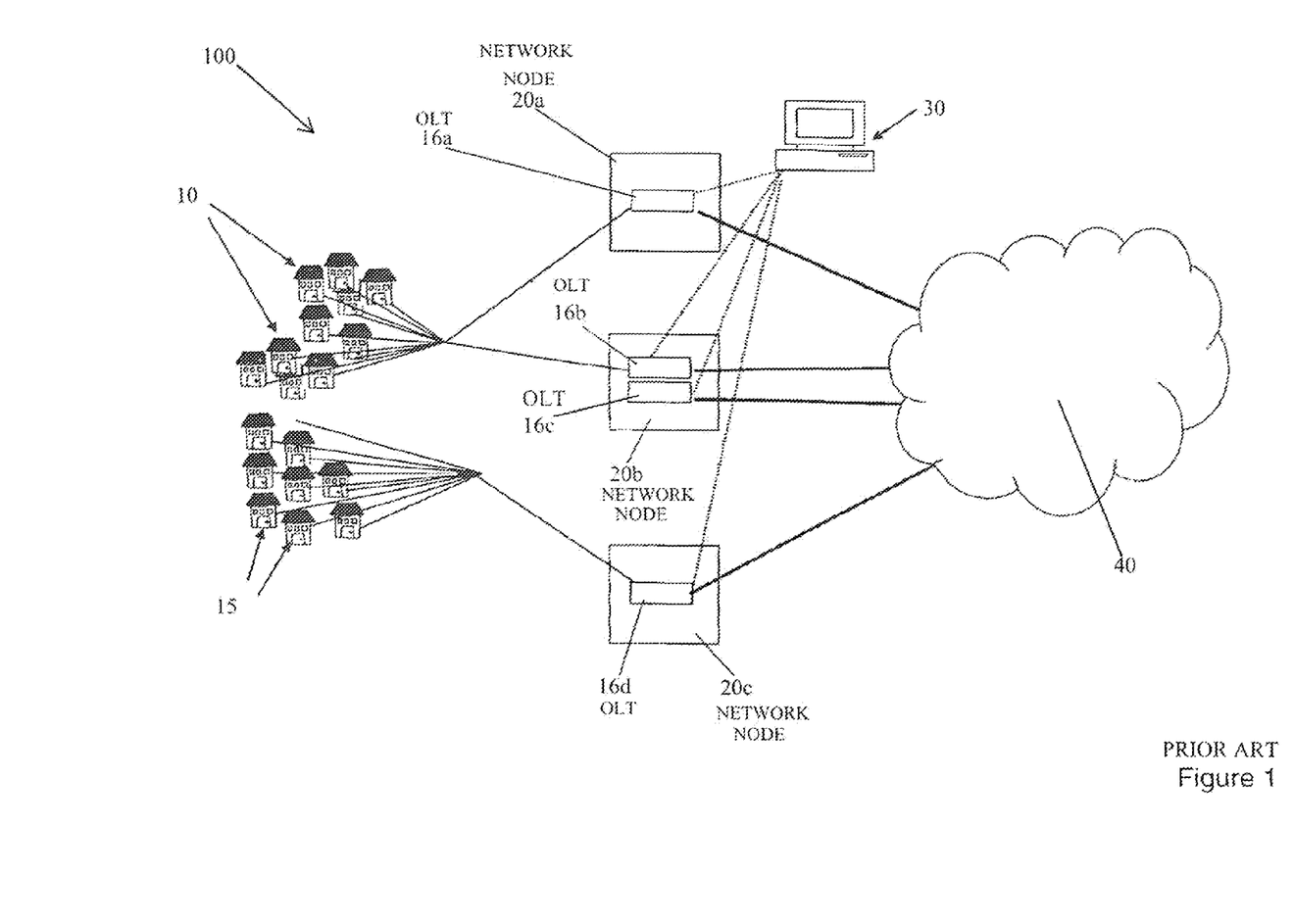
FIG. 1 shows a schematic depiction of a conventional dual-homed PON architecture.

One approach to this problem is to use dual-homed PONs to enable the rapid restoration of communication services. FIG. 1 shows a schematic depiction of a conventional dual-homed PON architecture. A PON 100 comprises a first plurality of optical network terminals (ONTs) 10 and a second plurality of optical network terminals (ONTs) 15. The first plurality of optical network terminals (ONTs) 10 are connected to a first optical line terminal (OLT) at network node 20a via optical fibers and a passive optical splitter. The first OLT 16a is then connected on to a core network 40 for the subsequent routing of traffic. To provide resilience, the first plurality of ONTs is also connected to a second OLT 16b at network node 20b, which is also connected to the core network 40. Similarly, the second plurality of ONTs 15 are connected to a third OLT 16c, which is located at the second network node 20b and to a fourth OLT 16d which is located at a third network node 20c. Conventionally, the first plurality of ONTs will communicate with the first OLT but in the event of a network fault, or other contingency, then the first plurality of ONTs will switch to the second OLT. Similarly, the second plurality of ONTs are dual homed to OLTs at network nodes 20b & 20c. That is, under normal conditions the second plurality of ONTs are in communication with the third OLT 16c but if the network were to be damaged or otherwise disturbed then they would switch to communicating with the fourth OLT 16d. All of the OLTs at the various network nodes 20a, 20b & 20c are connected to a PON management system 30.

Whilst the GPON (Gigabit PON) standards defined in the ITU-T G.984 series define how a PON can switch traffic to the appropriate OLT in the event of a network failure, there is no definition in those standards as to how the higher network levels need to switch traffic in the event of a failure. J. Kang et al, "*Restoration of Ethernet Services over a Dual-Homed GPON System—Operator Requirements and Practical Demonstration*", Proceedings of OFC/NFOEC 2008, discloses an Ethernet OAM based solution, in which an Ethernet edge switch in a communications provide (CP) point of presence (PoP) will check the connectivity status between itself and each individual ONT (or customer premises equipment (CPE) periodically. This solution requires each individual CPE to implement Ethernet OAM functionality, thus increasing the cost of the CPE devices.

D. Hunter and T. Gilfedder, "*Routing and fast protection in networks of long-reach PONs*", BT Technology Journal, Vol. 24-2, p.p. 26-32 (2006), propose a protocol called FROTH (Fast Recovery for OLTs via Transmission of Hellos). This solution uses status packets to exchange network status information and requires either additional external FROTH routers at each CP PoP or additional functionality implemented in existing routers to support the proposed fault detection mechanism. EP 1 176 765 discloses a PON in which multiple network paths are provided to customer equipment, with protection switching being enabled in the event that a fault occurs in one of the network paths.

A yet further option is to run dynamic IP routing protocols between a communications provider's network and the customer premises equipment (CPE), which can detect the loss of connectivity when the protocol keep-alive timer times out due to loss of connectivity. However, this solution has very limited stability which may make it prohibitive to deploy in broadband access networks where millions of CPE may be connected. That is why most CPEs use static routing instead of dynamic routing.

SUMMARY

In an embodiment, a communications network comprises first and second optical line terminals and one or more optical network terminals wherein: i) the first optical line terminal has a first network connection to the one or more optical network terminals, the first network connection being active and carrying traffic from the one or more optical network terminals to the first optical line terminal; ii) the second optical line terminal has a second network connection to the one or more optical network terminals, the second network connection being a standby network connection; iii) the first optical line terminal has a connection to a first edge router in a first core network and the second optical line terminal has a connection to a second edge router in the first core network; iv) the connection between the first optical line terminal and the first edge router has an associated first metric and the connection between the second optical line terminal and the second edge router has an associated second metric, the values of the first metric and the second metric being such that data transmitted between the one or more optical network terminals and the first core network is routed via the connection between the first optical line terminal and the first edge router; the network being configured to, in use, on detecting a failure in the first network connection: a) activate the second network connection such that active traffic is sent from the one or more optical network terminals to the second optical line terminal; and b) change the value of the first metric relative to the value of the second metric such that data transmitted between the one or more optical network terminals and the first core network is routed via the connection between the second optical line terminal and the second edge router.

In contrast to solutions known in the prior art, embodiments do not require that additional functionality be provided within customer premises equipment, that additional hardware be deployed within either the access network or that significant resource of existing network equipment is utilized. Embodiments can require the implementation of standards-based protocols and network elements that are supported by conventional equipment that is available off the shelf. Therefore, embodiments can provide a cost-effective, low-overhead, standards-based solution.

Another embodiment relates to a method of transmitting data in a communications network, the network comprising first and second optical line terminals and one or more optical network terminals wherein: i) the first optical line terminal has a first network connection to the one or more optical network terminals, the first network connection being active and carrying traffic from the one or more optical network terminals to the first optical line terminal; ii) the second optical line terminal has a second network connection to the one or more optical network terminals, the second network connection being a standby network connection; iii) the first optical line terminal has a connection to a first edge router in a first core network and the second optical line terminal has a connection to a second edge router in the first core network; iv) the connection between the first optical line terminal and the first edge router has an associated first metric and the connection between the second optical line terminal and the second edge router has an associated second metric, the values of the first metric and the second metric being such that data transmitted between the one or more optical network terminals and the first core network is routed via the connection between the first optical line terminal and the first edge router; the method comprising the steps of, on detecting a failure in the first network connection: a) activating the second network connection such that active traffic is sent from the one or more optical network terminals to the second optical line terminal; and b) changing the value of the first metric relative to the value of the second metric such that data transmitted between the one or more optical network terminals and the first core network is routed via the connection between the second optical line terminal and the second edge router.

Another embodiment relates to a tangible data carrier for use in a computing device, the data carrier comprising computer executable code which, in use, performs a method as hereinbefore described.

BRIEF DESCRIPTION OF THE DRAWINGS

The invention will now be described with reference to the following Figures, which are provided by way of example only, in which.

DETAILED DESCRIPTION

Figure 2:
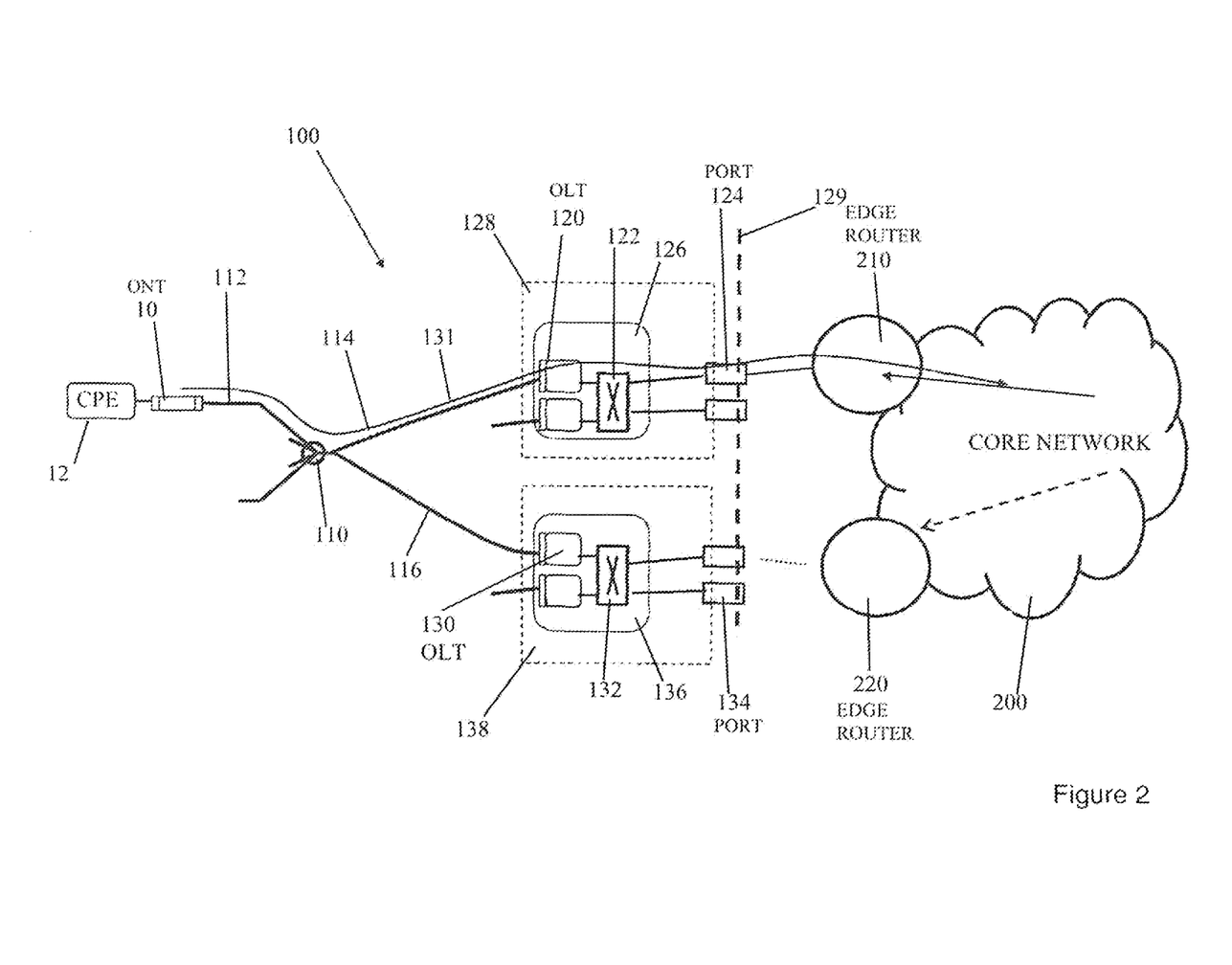
FIG. 2 shows a schematic depiction of a communications network according to the present invention.

FIG. 2 shows a schematic depiction of a communications network according to an embodiment. In the United Kingdom, and in other countries, the regulatory environment allows other communication providers (CPs) some degree of access to the access network that is owned and operated by one of the main communications providers. FIG. 2 shows an ONT 10 connected to a dual homed PON 100. FIG. 2 shows that the ONT 10 is connected to customer premises equipment 12, such as a home gateway or set top box, which can terminate an IP connection carried over the PON. It should be understood that the functionality of the CPE and the ONT could be incorporated into a single device. For the sake of simplicity in the following discussion reference will be made to the ONT only. The ONT 10 is connected to an optical splitter 110 via optical fiber drop cable 112. The optical splitter 110 is connected to a first OLT 120 via first optical fiber connection 114 and to a second OLT 130 via second optical fiber connection 116. To provide the required network resilience, the first OLT 120 will be sited remotely from the second OLT 130, for example at least several kilometers from each other, and the first optical fiber connection 114 (from the first OLT 120 to the optical splitter 110) will be routed separately from the second optical fiber connection 116 (from the second OLT 130 to the optical splitter 110) such that a single incident cannot damage both of these connections. For the sake of clarity FIG. 2 shows only a single ONT 10 but it will be understood that in practice a PON will comprise many ONTs, possibly in excess of 100.

The first OLT 120, and associated equipment, is located at a first network location 128 and similarly the second OLT 130 is located at a second network location 138. At the first location a first OLT chassis 126 will comprise one or more OLTs 120. These OLTs are connected to a switch 122 comprised within the chassis. The switch 122 aggregates the traffic from all the OLTs 120 and cross-connects the traffic to different uplink ports 124a, 124b, . . . , 124n. The uplink ports will be the demarcation points 129 between the access network operator and the various CPs. Similarly, a second OLT chassis 136 is located at the second network location and comprises one or more OLTs 130 and a second switch 132.

In operation, traffic 131 from the ONTs is routed from the ONT to the first OLT, via the optical splitter and the first optical fiber connection. Each of the ONTs will be associated with a CP, who will be providing one or more services (telephony, broadband, etc.) to the customer associated with the ONT. The data received at the first OLT is sent to first switch 122 which then switches the traffic to one of a first plurality of ports 124a, 124b, . . . , 124n connected to the switch. Each port is associated with a CP and traffic switched to that port will be forwarded to the core network operated by that CP. For the sake of clarity only a single core network 200 is shown, but it will be understood that in practice several core networks will be connected to the first OLT, via the switch and a dedicated port. The access network may provide a transparent Ethernet transport service from the ONT user network interface to the communications port, which is the OLT uplink interface. Thus, the access network may not be involved in any IP layer communications.

The core network comprises first and second edge routers 210, 220, each of which comprise a point of presence (PoP) for the CP's core network. The first edge router receives data from the first OLT, via the switch and the port, and then routes it across the core network. Data that is sent from the core network 200 to the ONT 10 is routed to the first edge router, then to the first switch, to the first OLT and then to the ONT via the first optical fiber connection and the optical splitter.

The second OLT is similarly connected to the second edge router 220, via second switch 132 and one of a first plurality of ports 134a, 134b, . . . , 134n connected to the second switch.

The second OLT is a standby OLT and is thus not in use during the normal operation of the network. In the core network, the routing to the first edge router 210 (and hence to the ONT via the first OLT) is defined as a primary route, whereas the routing to the second edge router 220 (and hence to the ONT via the second ONT) is defined as a secondary route. The definition of the routes as primary can be effected by defining a metric that is used in the routing protocol used by the core network. For example, the metric associated with the route to the first edge router may have a value of 5 and the metric associated with the route to the first edge router may have a value of 10. As a smaller metric value is better than a larger metric value, this will cause the route to the to the first edge router to be defined as the primary route from the core network to the ONT and thus data associated with this route will be held in the routing table of the core network.

GPON standards (ITU-T Recommendation G.984.1/2/3/4 for GPON, 2008) have defined a comprehensive set of OAM functionality, including alarms for individual ONT faults, PON faults (e.g. loss of signal or loss of frame), ONT UNI faults, etc. GPON can manage ONTs via an embedded OAM channel (OMCI), including IP layer parameters such as IP address and prefix, default gateways etc. Therefore the OLT has a complete knowledge of status of each network element and link. If the IP end point is embedded in the ONT (e.g., ONTs with an integrated home gateway or VoIP adaptor), then the OLT will be able to have a complete knowledge of these IP attributes for each of the ONTs. In the case where the IP end point is CPE, different approaches can be taken to enable the GPON OLT to obtain the needed IP information. For example, if DHCP is used to provide dynamic IP addresses then DHCP snooping can be enabled such that the OLT can record what IP address has been leased to an IP end point. For statically provisioned IP addresses, the access network provider can obtain a list of provisioned IP addresses from the communications provider/service provider via a defined business gateway and feed this information to the OLT. Using the IP information and the GPON information in the GPON management information base (MIB), the OLT can map each PON to a number of associated IP subnets.

Although the GPON system has a complete view of the status of each network entity in the access network, there is no mechanism to communicate this information directly to the CP network(s) to enable it to take appropriate further actions during a resilience switchover.

The OLT acts to receive data from the ONTs that it is connected to, to aggregate them as Ethernet traffic and then switch them to the appropriate core network. Conventionally, the Ethernet links connecting an OLT to the core network(s) would not have an associated IP address and there would not be any IP layer connectivity between an OLT and a core network.

Figure 3:
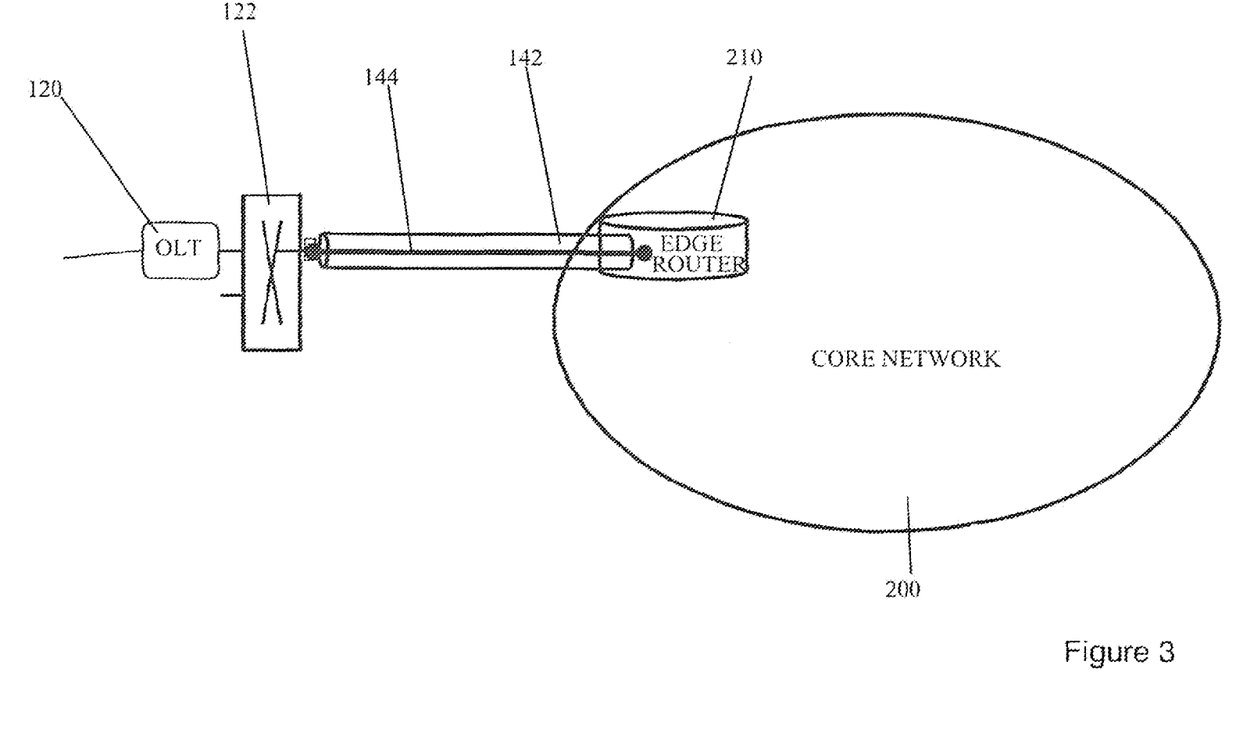
FIG. 3 shows a schematic depiction of the configuration of a virtual local network (VLAN).

In embodiments, an IP connection is established between the OLT and each of the core network routers to which the OLT is connected. In order to support this connection in band, a VLAN is configured between the OLT and each of the edge routers, with both ends of the VLAN being configured as IP end points such that IP packets can be exchanged over the VLAN. FIG. 3 shows a schematic depiction of the VLAN can be configured.

FIG. 3 shows the Ethernet connection 142 which connects the first OLT 120 and the first switch 122 to the first edge router 210 in the core network. The VLAN 144 is configured over this Ethernet connection 142 in order to establish an IP connection between the OLT and the edge router. As it is likely that there will only be several CPs wishing to connect to an OLT, each OLT will not need to establish a large number of VLANs.

Configuring a VLAN as a virtual IP interface is a basic feature of any carrier class Ethernet switch and is even supported by many currently available low-end Ethernet switches, for example, Cisco® 2950 or 3750, and thus the implementation of this feature at the OLT should not be problematic. Similarly, this configuration of a VLAN is a standard feature in commonly used edge routers, such as, for example, Cisco® 7200 or 7600.

Table 1 below shows how a GPON level fault can be mapped to corresponding IP subnets. The table should be populated when the end user devices acquire an IP address, either by a static configuration (e.g. via GPON OMCI) or dynamic allocation (e.g. via DHCP) {see above}. Table 1 shows that as GPON-1-1 (which may be slot 1 and PON-port 1 on the chassis) is associated with three different subnets then it will be connected to end users of three different CPs. The output interface for the signaling message of each CP is also included, which will be used to send out the produced signaling messages.

For example, if PON-1-1 were to fail, then a LoS-PON-1-1 alarm will be generated, which will trigger three signaling messages corresponding to the three affected subnets. The three messages will then be sent to the relevant edge routers via the corresponding output VLAN interfaces.

TABLE 1

PON-IP subnet mapping table

| GPON ID | Associated IP Subnet | Output Interface |
|---|---|---|
| PON-1-1 | 10.0.10.0/28, | VLAN78 (to CP1) |
|  | 10.0.20.16/29, | VLAN65 (to CP2) |
|  | 10.1.22.128/29 | VLAN64 (to CP3) |
| PON-1-2 | 10.0.10.16/28, | VLAN78 (to CP1) |
|  | 10.0.20.17/29 | VLAN65 (to CP2) |
| PON-2-1 | 10.1.22.64/27 | VLAN64 (to CP3) |

Figure 4:
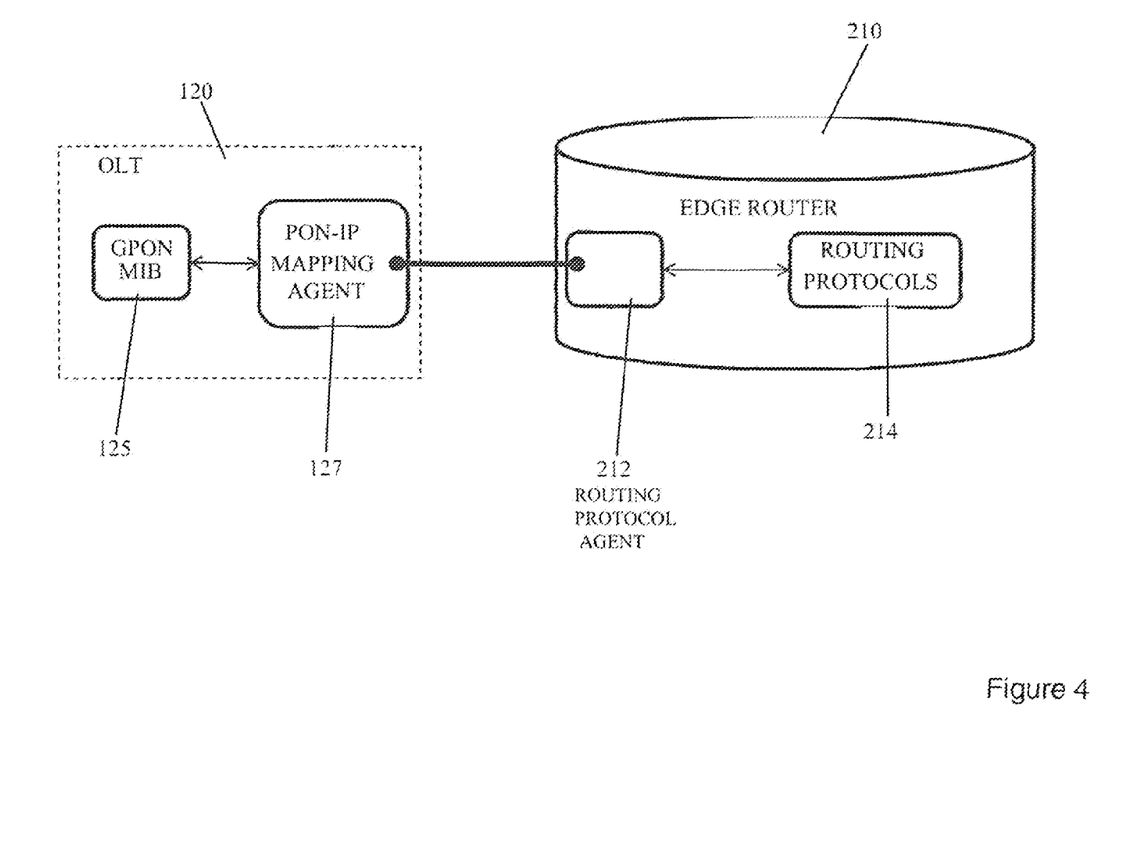
FIG. 4 shows a schematic depiction of an optical line terminal (OLT).

The table described above can be maintained in a PON-IP mapping agent residing in the OLT controller system. FIG. 4 shows a schematic depiction of the OLT 120 which comprises the GPON MIB (Management Information Base) 125 and PON-IP mapping agent 127. The PON-IP mapping agent 127 interacts with the GPON MIB to obtain the information of the network elements and their status and may also need IP layer information from external sources if it is not available in the GPON MIB. In an embodiment, the PON-IP mapping agent is also responsible for generating signaling messages and sending them to the IP interface of the VLAN. The routing messages are received by a routing protocol agent 212 comprised within the edge router and are then used to modify one or more of the routing protocols 214 used within the core network. For example, Routing Information Protocol version 2 (RIP v2) routing messages (see RIP version 2, IETF RFC2453, http://tools.ietf.org/html/rfc2453) can be used when sending the routing messages from the OLT to the core router, but it will be understood that other routing protocols may be used instead. Note that although in this particular example a PON-level fault has been mapped, in practice different levels of network entity failure can be mapped to IP layer subnet, according to requirements.

It should be noted that the mapping agent does not need to implement a full routing protocol stack nor maintain any external route state. The only functionality required is to generate routing protocol messages to signal the CP edge routers the detected fault by manipulating the metrics of the announced IP routes. Therefore it will require very little computing power and memory usage from the OLT. As shown in FIG. 4, RIPv2 routing is needed in the CP edge router to receive and process RIP messages from the OLT. RIPv2 is supported in nearly all IP routers therefore no new functionality is needed in the CP's network to support the present invention. As RIPv2 is not the ideal routing protocol for a large core, other routing protocols such as OSPF, BGP etc. could be running as the global routing protocol for the core network. In this case the RIPv2 will be only enabled at the edge routers and redistribute the learnt routes to the global routing protocol so they can be propagated to the whole network. Therefore the proposed solution does not require CPs to change their current routing protocol.

Figure 5:
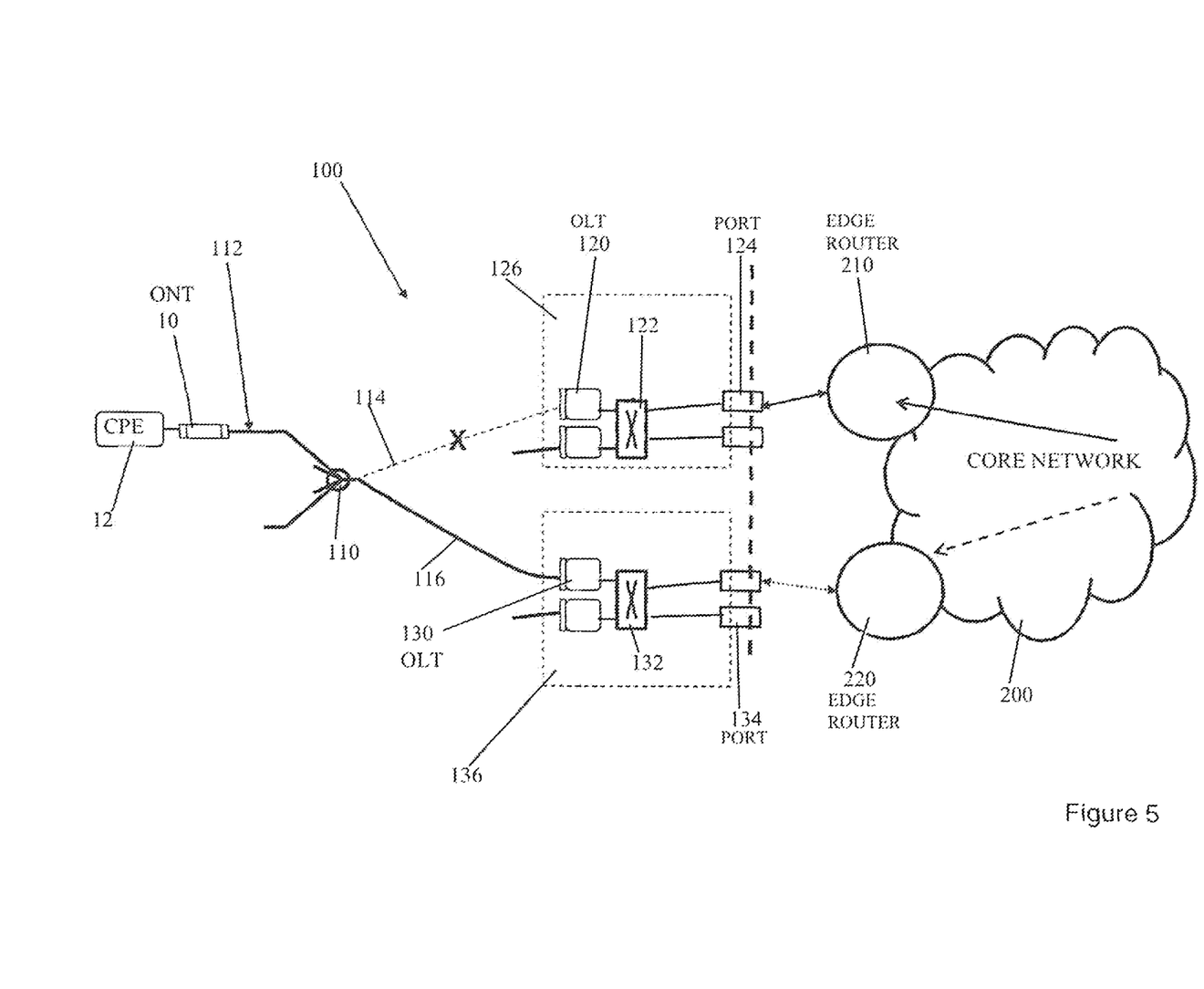
FIG. 5 shows a schematic depiction of the operation of a communications network according to an embodiment when a problem occurs in the passive optical network (PON).

FIG. 5 shows a schematic depiction of the operation of a network according to an embodiment when a problem occurs in the PON, namely the first optical fiber connection being broken. The OLT OAM will detect the loss of signal (LoS) event for the PON and raise a LoS alarm immediately after asserting it as a fault. The GPON dual-parenting mechanism will disable the PON port at the first OLT 120 and enable the PON port at the second OLT 130 to finish the protection switchover in GPON layer. By now the upstream traffic should be restored so the core network 200 will start receiving the upstream traffic at the second edge router 220.

If no further action is taken, the downstream traffic will still be forwarded to the first edge router 210, and thence to the primary OLT where it will be discarded by the OLT as the downlink PON has failed. However, the PON-IP mapping agent will be triggered by the LoS alarm trap and will search the PON-IP mapping table to map the affected PON ID to the corresponding IP subnets. When this process is finished, the obtained information will be used to generate RIP v2 messages which are then sent to the first edge router 210 to announce that the route is unreachable via the primary OLT. In RIP v2 assigning a metric of 16 means that the route is unreachable. It will be understood that a similar effect may be achieved by lowering the metric associated with the route between the second OLT and the second core router (and/or increasing the metric associated with the route between the second OLT and the second core router) such that the second metric is less than the first metric.

After switchover, the route to the primary OLT from the core node will maintained as being unreachable until the network fault has been resolved. During this time, the secondary route via PoP2 edge router and the secondary OLT will be used, as shown in FIG. 5. Once the fault has been fixed, the GPON dual-parenting control system may bring the first OLT back online and revert the second OLT to its backup state. In such a case, the first OLT will generate new routing messages to the first edge router at PoP1 which comprise the original metric, which will signal the first edge router to take over the downstream traffic forwarding again. The network will return to the normal operation state as shown in FIG. 2.

The result of this is that the nodes in the core network will withdraw the routes pointing to the first core edge router. As a backup route has been preconfigured, it will be automatically installed in the routing table so the downstream traffic can be directed to the second edge router. If a different global routing protocol is used, the secondary route will be redistributed to it. By now, both upstream and downstream IP connectivity have been restored.

One of the advantages of embodiments of the mechanism is that all the elements of the mechanism are standards based: RIP messages, VLAN, IP addresses, GPON OAM/MIB. At the same time, no special communication channel is needed; all needed is to create a new VLAN over the existing data link between the OLT and the CP edge switch. Therefore, it will be able to provide a cost-effective, low-overhead and standards-based solution.

Although the preceding discussion has focused on PONs it will be readily understood that embodiments are also capable of use with other network structures, for example Fiber to the Cabinet (FTTCab) or Fiber to the Kerb (FTTK) (or Fiber to the Curb, FTTC) in which the portion of the network that is not optical fiber comprises a wireless link or a twisted pair or coaxial cable connection. In general, if there is some degree of physical separation in the network path between the service provider (or the hardware of the network provider) then it is possible to utilize embodiments to provide additional duplication at the service level.

It will be understood that embodiments can be implemented in software or computer code on a switch or router that is located within a communications network. Such computer code can be deployed to such an apparatus via download, for example via the internet, or on some physical media, for example, DVD, CD-ROM, USB memory stick, etc.

In summary, embodiments provide a passive optical network (PON) which uses existing GPON OAM functionality and standard routing protocol messages to solve the downstream routing problem between an access service provider and one or more other communication provider networks.

The invention claimed is:
1. A communications network comprising:
first and second optical line terminals and one or more optical network terminals, wherein:
the first optical line terminal has a first network connection to the one or more optical network terminals, the first network connection being active and carrying traffic from the one or more optical network terminals to the first optical line terminal;
the second optical line terminal has a second network connection to the one or more optical network terminals, the second network connection being a standby network connection;
the first optical line terminal has a connection to a first edge router in a first core network and the second optical line terminal has a connection to a second edge router in the first core network;
the connection between the first optical line terminal and the first edge router has an associated first metric and the connection between the second optical line terminal and the second edge router has an associated second metric, the values of the first metric and the second metric being such that data transmitted between the one or more optical network terminals and the first core network is routed via the connection between the first optical line terminal and the first edge router;
the network being configured to, in use, on detecting a failure in the first network connection;
activate the second network connection such that active traffic is sent from the one or more optical network terminals to the second optical line terminal; and
change the value of the first metric relative to the value of the second metric such that data transmitted between the one or more optical network terminals and the first core network is routed via the connection between the second optical line terminal and the second edge router.
2. The communications network according to claim 1, comprising a passive optical network.

3. The communications network according to claim 2, wherein the first network connection between the first optical line terminal and the one or more optical network terminals comprises an optical splitter.

4. The communications network according to claim 2, wherein the second network connection between the second optical line terminal and the one or more optical network terminals comprises an optical splitter.

5. The communications network according to claim 1, wherein the connection between the first optical line terminal and the first edge router and the connection between the second optical line terminal and the second edge router comprise an Ethernet connection.

6. The communications network according to claim 5, wherein the connection between the first optical line terminal and the first edge router and the connection between the second optical line terminal and the second edge router further comprise a VLAN formed over the Ethernet connection.

7. The communications network according to claim 6, wherein the connection between the first optical line terminal and the first edge router and the connection between the second optical line terminal and the second edge router further comprise an internet protocol connection formed within the VLAN.

8. The communications network according to claim 1, wherein the first optical line terminal and the second optical line terminal are connected to a plurality of core networks, each of the core networks comprising a respective first and second edge routers.

9. A method of transmitting data in a communications network, the network comprising first and second optical line terminals and one or more optical network terminals, wherein the first optical line terminal has a first network connection to the one or more optical network terminals, the first network connection being active and carrying traffic from the one or more optical network terminals to the first optical line terminal; the second optical line terminal has a second network connection to the one or more optical network terminals, the second network connection being a standby network connection; the first optical line terminal has a connection to a first edge router in a first core network and the second optical line terminal has a connection to a second edge router in the first core network; and the connection between the first optical line terminal and the first edge router has an associated first metric and the connection between the second optical line terminal and the second edge router has an associated second metric, the values of the first metric and the second metric being such that data transmitted between the one or more optical network terminals and the first core network is routed via the connection between the first optical line terminal and the first edge router, the method comprising, on detecting a failure in the first network connection:

activating the second network connection such that active traffic is sent from the one or more optical network terminals to the second optical line terminal; and changing the value of the first metric relative to the value of the second metric such that data transmitted between the one or more optical network terminals and the first core network is routed via the connection between the second optical line terminal and the second edge router.

10. A tangible, non-transitory computer-readable data carrier for use in a computing device, the data carrier comprising computer executable code which, in use, performs a method according to claim 9.

* * * * *